United States Patent
Chen et al.

(10) Patent No.: US 10,688,571 B2
(45) Date of Patent: Jun. 23, 2020

(54) POSITIONING DEVICE FOR A MITER SAW

(71) Applicant: P & F BROTHER INDUSTRIAL CORPORATION, Taichung (TW)

(72) Inventors: Chun-Hung Chen, Taichung (TW); Chih-Yung Huang, Taichung (TW)

(73) Assignee: P & F BROTHER INDUSTRIAL CORPORATION, Taichung (TW)

( * ) Notice: Subject to any disclaimer, the term of this patent is extended or adjusted under 35 U.S.C. 154(b) by 0 days.

(21) Appl. No.: 16/101,830

(22) Filed: Aug. 13, 2018

(65) Prior Publication Data
US 2019/0070678 A1 Mar. 7, 2019

Related U.S. Application Data

(63) Continuation-in-part of application No. 15/842,271, filed on Dec. 14, 2017, now abandoned.

(30) Foreign Application Priority Data

Sep. 5, 2017 (TW) .............................. 106130264 A
Apr. 17, 2018 (TW) .............................. 107113051 A

(51) Int. Cl.
| | | |
|---|---|---|
| *B23D 45/04* | (2006.01) | |
| *B23D 47/02* | (2006.01) | |
| *B23D 47/08* | (2006.01) | |
| *B27B 5/36* | (2006.01) | |
| *B27B 5/29* | (2006.01) | |
| *B27B 5/18* | (2006.01) | |
| *B27G 19/02* | (2006.01) | |

(52) U.S. Cl.
CPC ......... *B23D 45/044* (2013.01); *B23D 45/048* (2013.01); *B23D 47/025* (2013.01); *B27B 5/29* (2013.01); *B27B 5/36* (2013.01); *B27B 5/185* (2013.01); *B27G 19/02* (2013.01)

(58) Field of Classification Search
CPC .... B23D 47/025; B23D 45/048; B23D 47/08; B23D 45/044; Y10T 83/7697; Y10T 83/7705; Y10T 83/7726
See application file for complete search history.

(56) References Cited

U.S. PATENT DOCUMENTS

| | | |
|---|---|---|
| 5,819,624 A | 10/1998 | Brault et al. |
| 6,810,780 B2 | 11/2004 | Ceroll et al. |
| 7,938,050 B2 | 5/2011 | Gehret |

(Continued)

OTHER PUBLICATIONS

Office Action dated Mar. 11, 2019 for U.S. Appl. No. 15/842,271.

*Primary Examiner* — Stephen Choi
(74) *Attorney, Agent, or Firm* — MLO, a professional corp.

(57) ABSTRACT

A positioning device for a miter saw includes a working table, an elastic member, and a lever member. The elastic member has a movable portion adapted to be adjacent to a scale disc of the miter saw, and a protruding portion. The lever member is disposed in the working table, and has a linking portion connected to the movable portion, and a handle portion movable to convert the elastic member from a locking state for engaging the protruding portion with one of notches in a scale disc of the miter saw so that the working table is non-rotatable, to a releasing state for moving the movable portion away from the scale disc so that, the protruding portion is disengaged from the one of the notches to permit rotation of the working table.

10 Claims, 17 Drawing Sheets

(56) References Cited

U.S. PATENT DOCUMENTS 7,992,478 B2 * 8/2011 Meredith ............. B23D 45/042
                                                                     83/471.3
9,833,849 B2 * 12/2017 Knight ................. B23D 45/024

* cited by examiner

POSITIONING DEVICE FOR A MITER SAW

CROSS-REFERENCE TO RELATED APPLICATION

This application is a continuation-in-part (CIP) of U.S. patent application Ser. No. 15/842,271, which claims priority of Taiwanese Patent Application No. 106130264, filed on Sep. 5, 2017. This application also claims priority of Taiwanese Patent Application No. 107113051, filed on Apr. 17, 2018.

FIELD

The disclosure relates to a positioning device, and more particularly to a positioning device for a miter saw.

BACKGROUND

Referring to FIGS. 1 to 3, U.S. Pat. No. 6,810,780 discloses a conventional positioning device 1 adapted for use in a miter saw 15. The miter saw 15 includes a base seat 151, and a working table 152 that is rotatably mounted to the base seat 151. The working table 152 has a body portion 153 and a mounting portion 154 that is connected to the body portion 153. The conventional positioning device 1 includes a scale disc 11, an elastic member 12, a linking member 13, and a lever member 14.

The scale disc 11 is disposed below the body portion. 15:3 of the working table 152, and is formed with a plurality of notches 111. The elastic member 12 has two fixing portions 121 connected fixedly to the body portion 153 of the working table 152, a movable portion 122 opposite to the fixing portions 121, and a protruding portion. 123 connected to the movable portion 122 and adapted to removably engage one of the notches ill of the scale disc 11. The linking member 13 has a cylindrical rod portion 131, and a coupling portion 132 connected to the rod portion 131 and removably connected to the mounting portion 154 of the working table 152. The lever member 14 has a biasing portion 141 abutting against the movable portion 122 of the elastic member 12, two opposite extension portions 142 connected to the biasing portion 141, two pivot portions 143 respectively connected to the extension portions 142 and rotatably connected to the rod portion 131 of the linking member 13, a handle portion 144 opposite to the biasing portion 141 and connected to the extension portions 142, and two reinforcing portions 145 connected to the biasing portion 141. The handle portion 144 is operable to drive movement of the biasing portion 141.

When the protruding portion 123 of the elastic member 12 engages one of the notches 111 of the scale disc 11, the working table 152 is non-rotatable relative to the base seat 151. When the handle portion 144 is downwardly pressed, the biasing portion 141 is moved upwardly to drive the movable portion 122 of the elastic member 12 to move away from the scale disc 11, so as to disengage the protruding portion 123 of the elastic member 12 from the one of the notches 111, and to thereby permit rotation of the working table 152 relative to the base seat 151.

However, each of the pivot portions 143 of the lever member 14 is required to be drilled to form a hole for retaining a respective end of the rod portion 131 of the linking member 13. Likewise, the mounting portion 154 of the miter saw 15 is required to be drilled to form threaded holes so that the coupling portion 132 can be threadedly secured to the mounting portion 154 with screws (not shown). Such configurations of the linking member 13 and the lever member 14 render the manufacturing and assembling of the conventional positioning device 1 relatively complicated.

SUMMARY

Therefore, an object, of the disclosure is to provide a positioning device for a miter saw that can alleviate at least one of the drawbacks associated with the abovementioned prior art.

Accordingly, the positioning device is adapted for use in a miter saw. The miter saw includes a base seat and a scale disc that is disposed on the base seat, and that is formed with a plurality of notches. The positioning device includes a working table, an elastic member, and a lever member. The working table includes a main portion that is adapted to be disposed above and connected rotatably to the base seat, and a mounting portion that extends in an extending direction from a side periphery of the main portion. The elastic member has a fixing portion that is connected fixedly to the working table, a movable portion that is opposite to the fixing portion and that is adapted to be adjacent to the scale disc, and a protruding portion that is connected to the movable portion, and that is adapted to removably engage one of the notches of the scale disc. The lever member is disposed in the mounting portion of the working table. The lever member has a linking portion that is connected to the movable portion of the elastic member, and a handle portion that is opposite to the linking portion. The handle portion of the lever member is movable to convert the elastic member from a locking state for engaging the protruding portion of the elastic member with the one of the notches so that the working table is non-rotatable relative to the base seat, to a releasing state for moving the movable portion of the elastic member away from the scale disc so that the protruding portion is disengaged from the one of the notches to permit rotation of the working table relative to the base seat.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
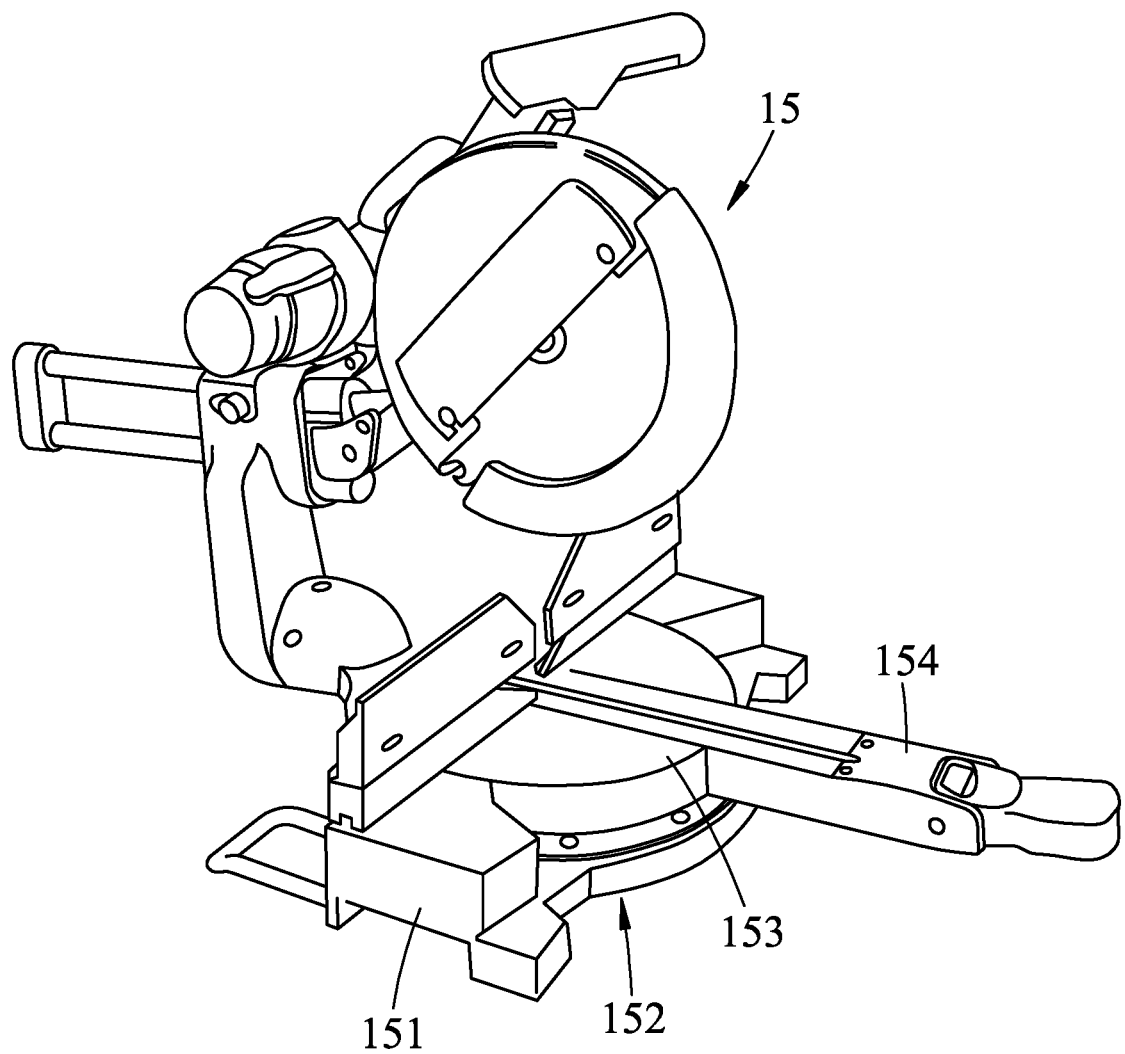
FIG. 1 is a perspective view of a conventional positioning device for a miter saw disclosed in U.S. Pat. No. 6,810,780.
Figure 2:
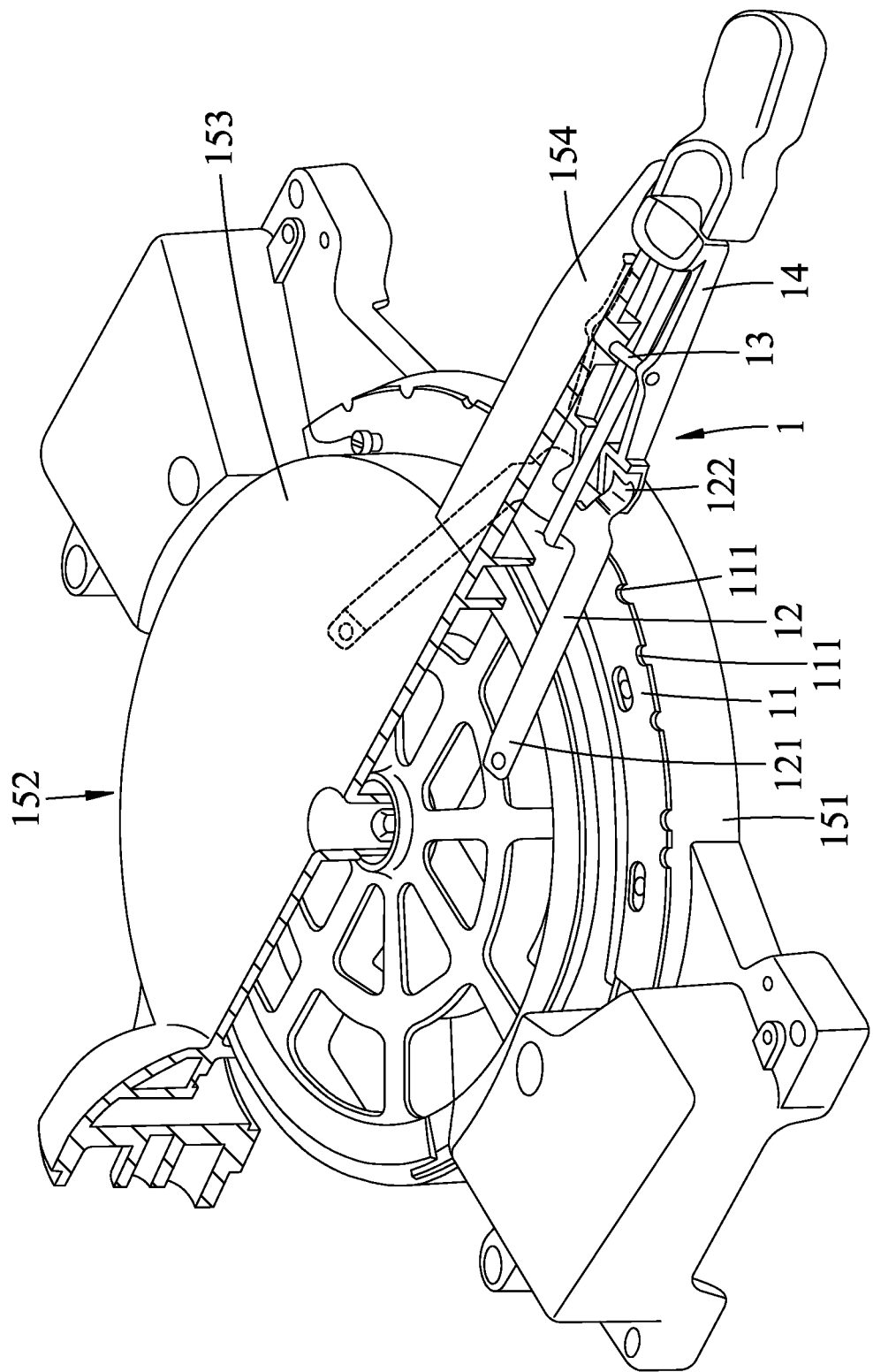
FIG. 2 is a perspective partly cutaway view of the conventional positioning device.
Figure 3:
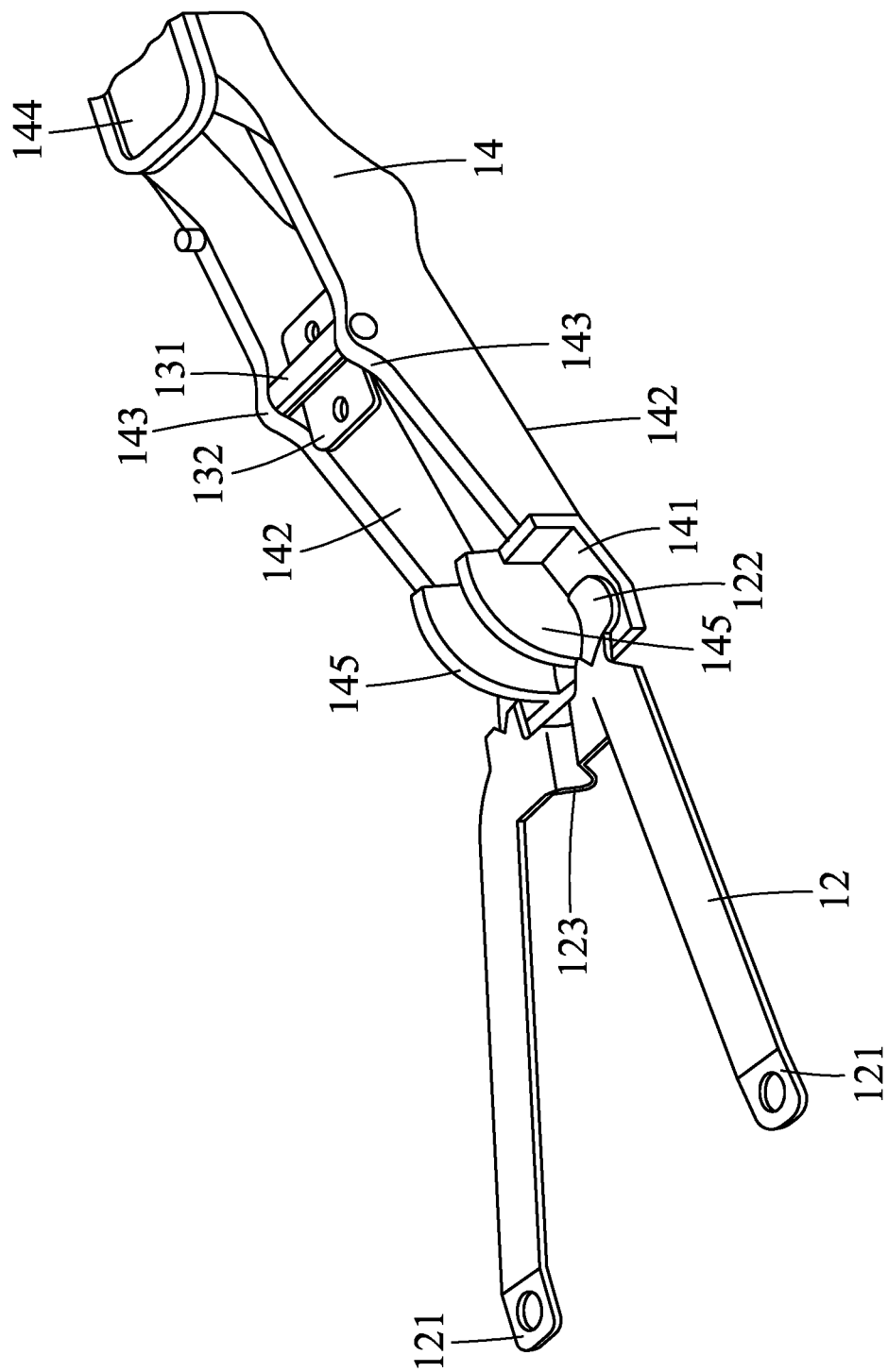
FIG. 3 is a perspective view of an elastic member, a linking member, and a lever member of the conventional positioning device.

Before the present invention is described in greater detail, it should be noted that where considered appropriate, reference numerals or terminal portions of reference numerals have been repeated among the figures to indicate corresponding or analogous elements, which may optionally have similar characteristics.

Figure 4:
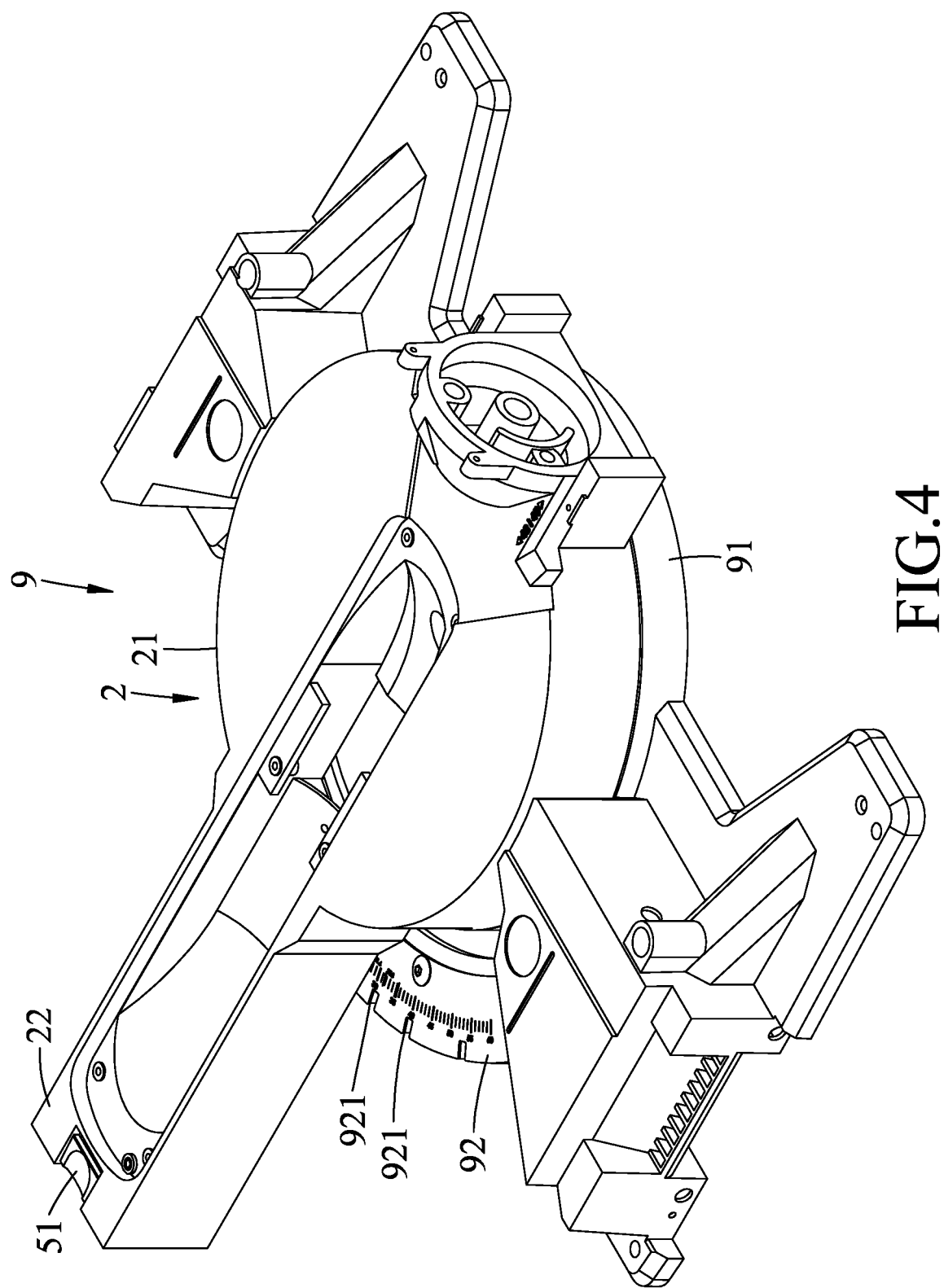
FIG. 4 is a perspective view of a miter saw mounted with a first embodiment of a positioning device according to the present disclosure.
Figure 5:
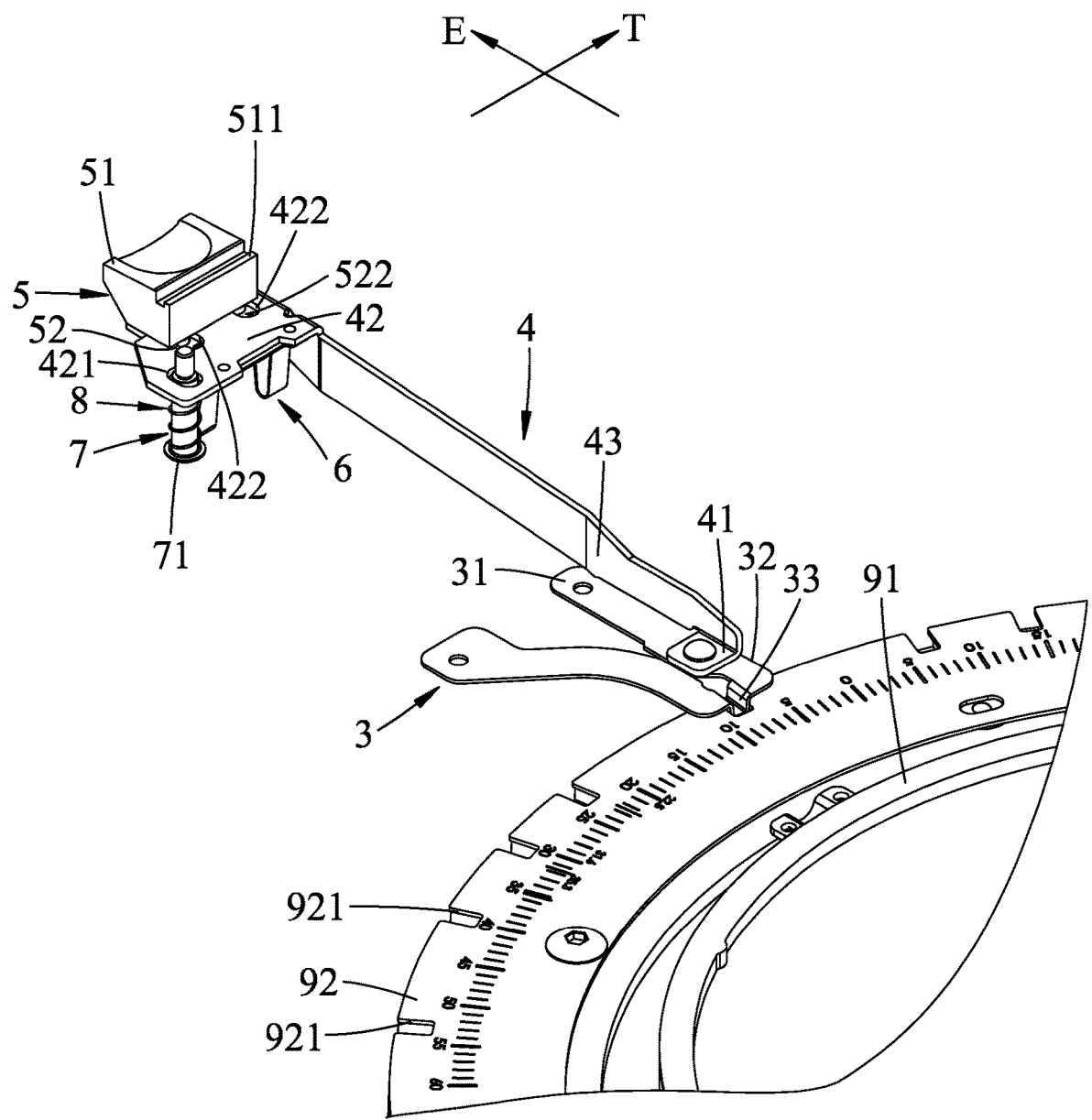
FIG. 5 is a fragmentary perspective view of the first embodiment and the miter saw, illustrating an elastic member, a lever member, and a slide block of the positioning device.
Figure 6:
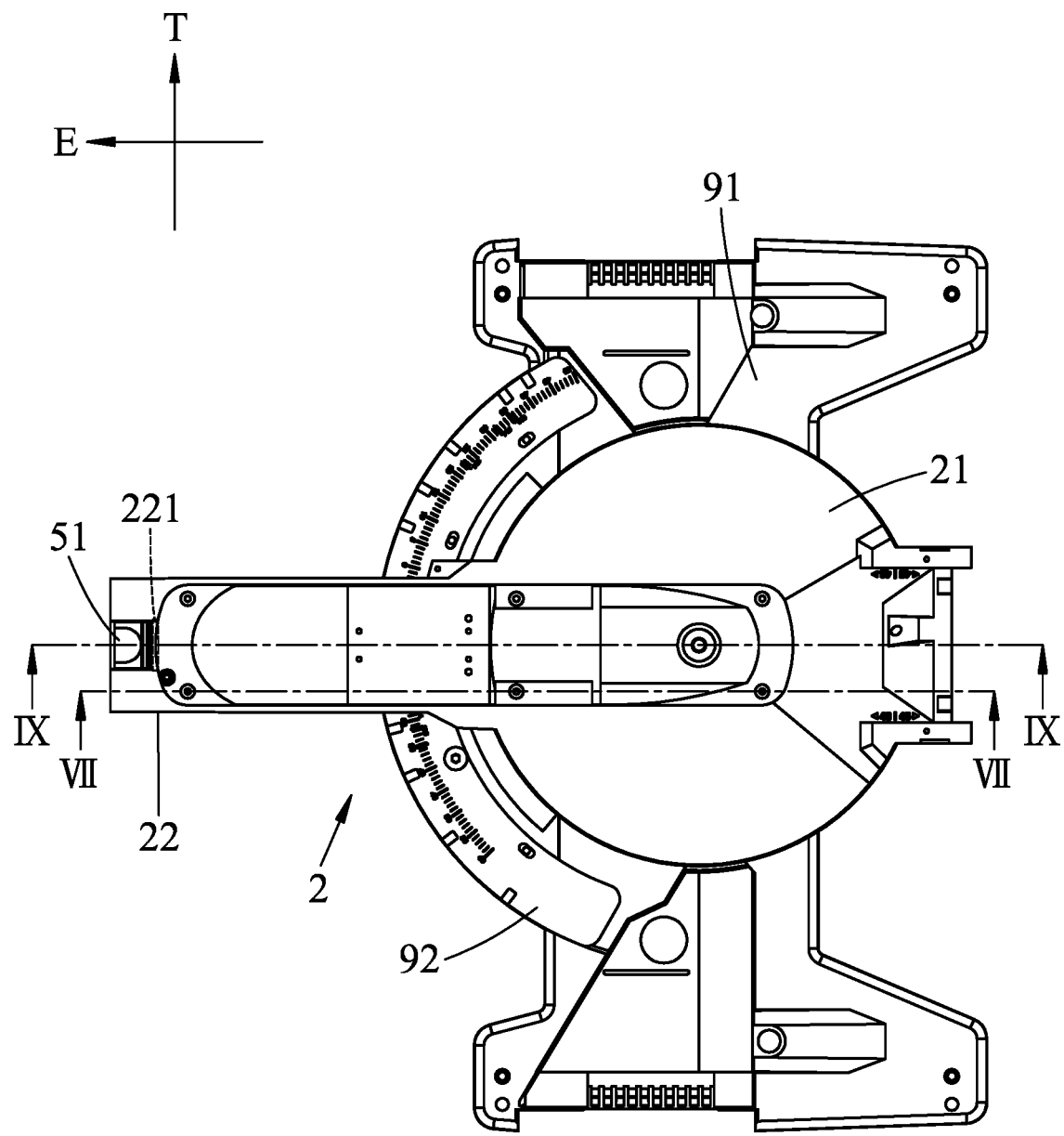
FIG. 6 is a top view of the first embodiment and the miter saw.

Referring to FIGS. 4 to 6, a first embodiment of a positioning device according to the present disclosure is adapted for use in a miter saw 9. The miter saw 9 includes a base seat 91, and a scale disc 92 that is disposed on the base seat 91, and that is formed with a plurality of notches 921. The positioning device includes a working table 2, an elastic member 3, a lever member 4, a slide block unit 5, a biasing member 6, an upright guide member 7, and a spring 8.

The working table 2 includes a main portion 21 adapted to be disposed above and connected rotatably to the base seat 91, and a mounting portion 22 extending in an extending direction (E) from a side periphery of the main portion 21.

Figure 7:
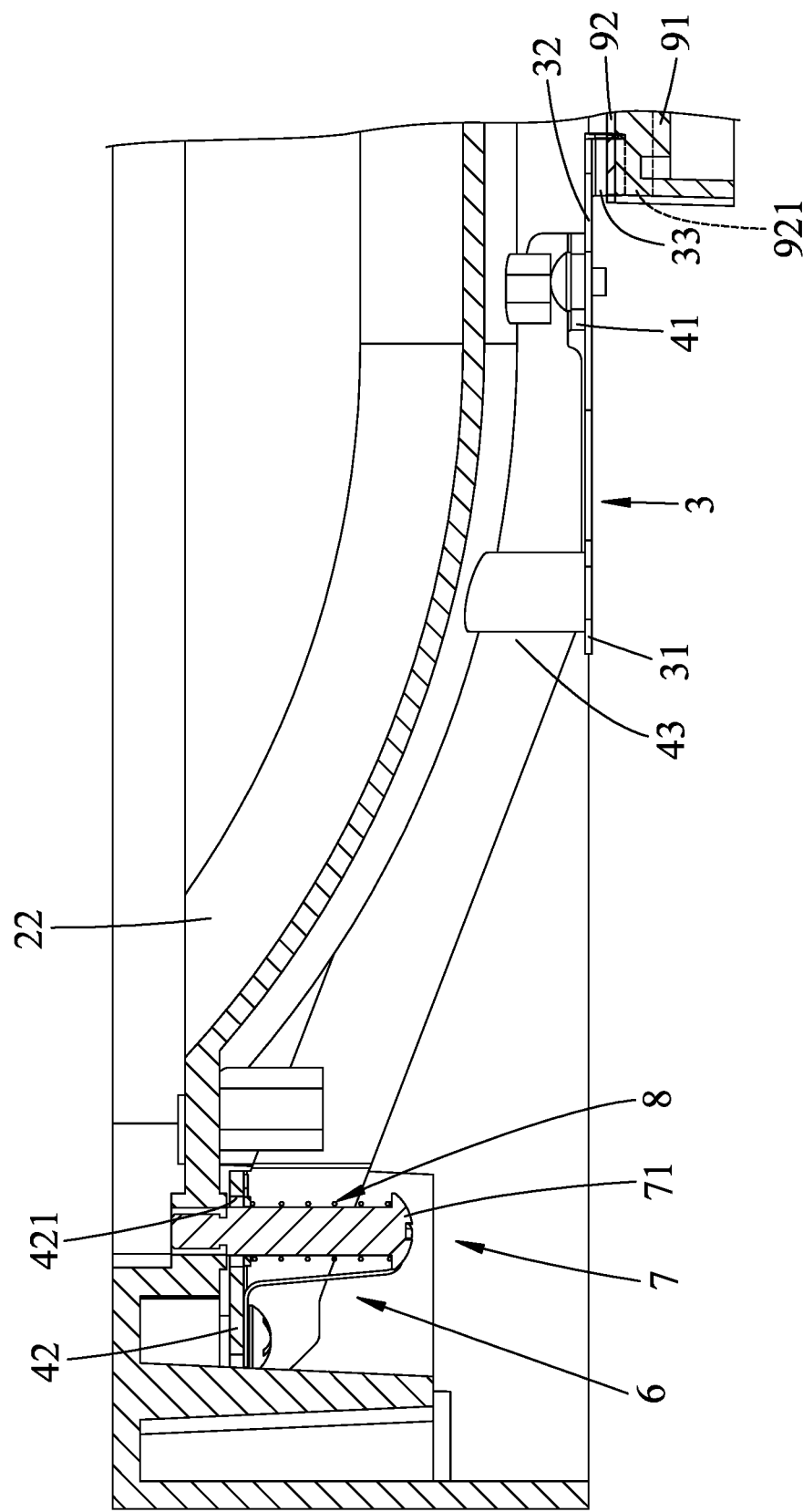
FIG. 7 is a fragmentary sectional view taken along line VII-VII in FIG. 6, illustrating the elastic member in a locking state.
Figure 8:
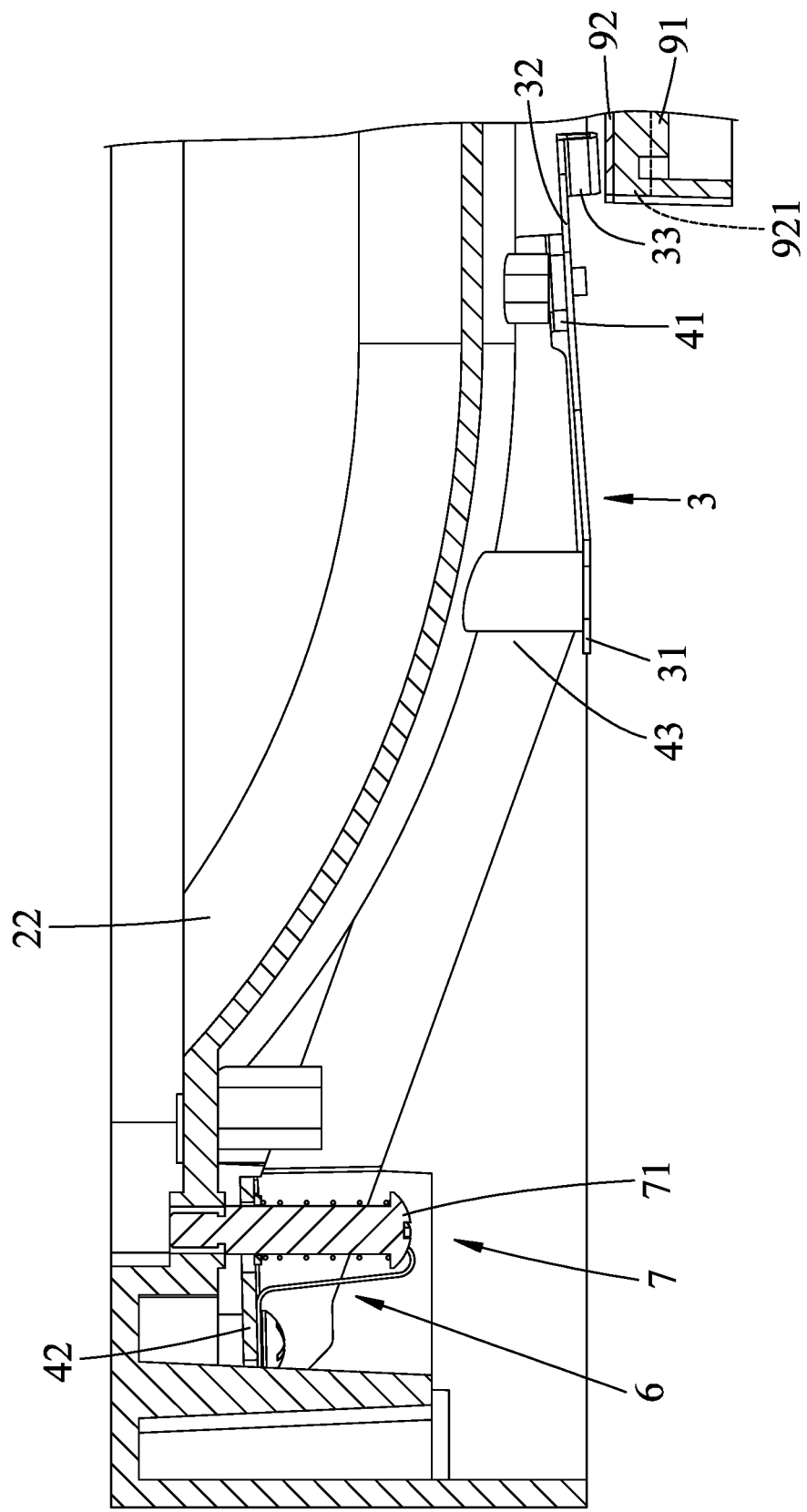
FIG. 8 is a view similar to FIG. 7, but illustrating the elastic member in a releasing state.

Referring to FIGS. 5, 7 and 8, the elastic member 3 has a fixing portion 31 connected fixedly to the mounting portion 22 of the working table 2 (see FIG. 4), a movable portion 32 opposite to the fixing portion 31 and adapted to be adjacent to the scale disc 92, and a protruding portion 33 connected to the movable portion 32 and adapted to removably engage one of the notches 921 of the scale disc 92.

Figure 9:
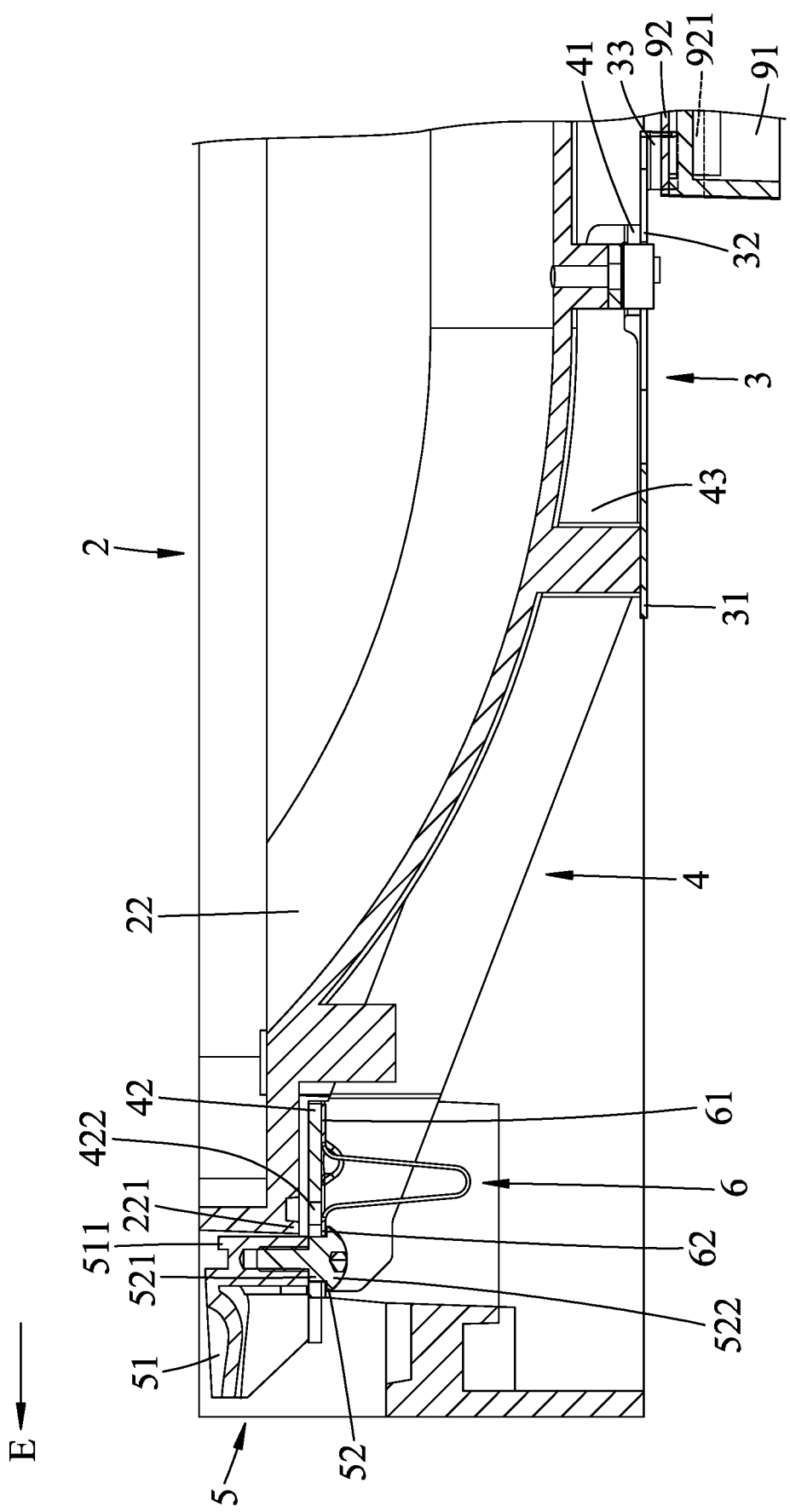
FIG. 9 is a fragmentary sectional view taken along line IX-IX in FIG. 6, illustrating the slide block at a non-engaging position when the elastic member is in the locking state.
Figure 10:
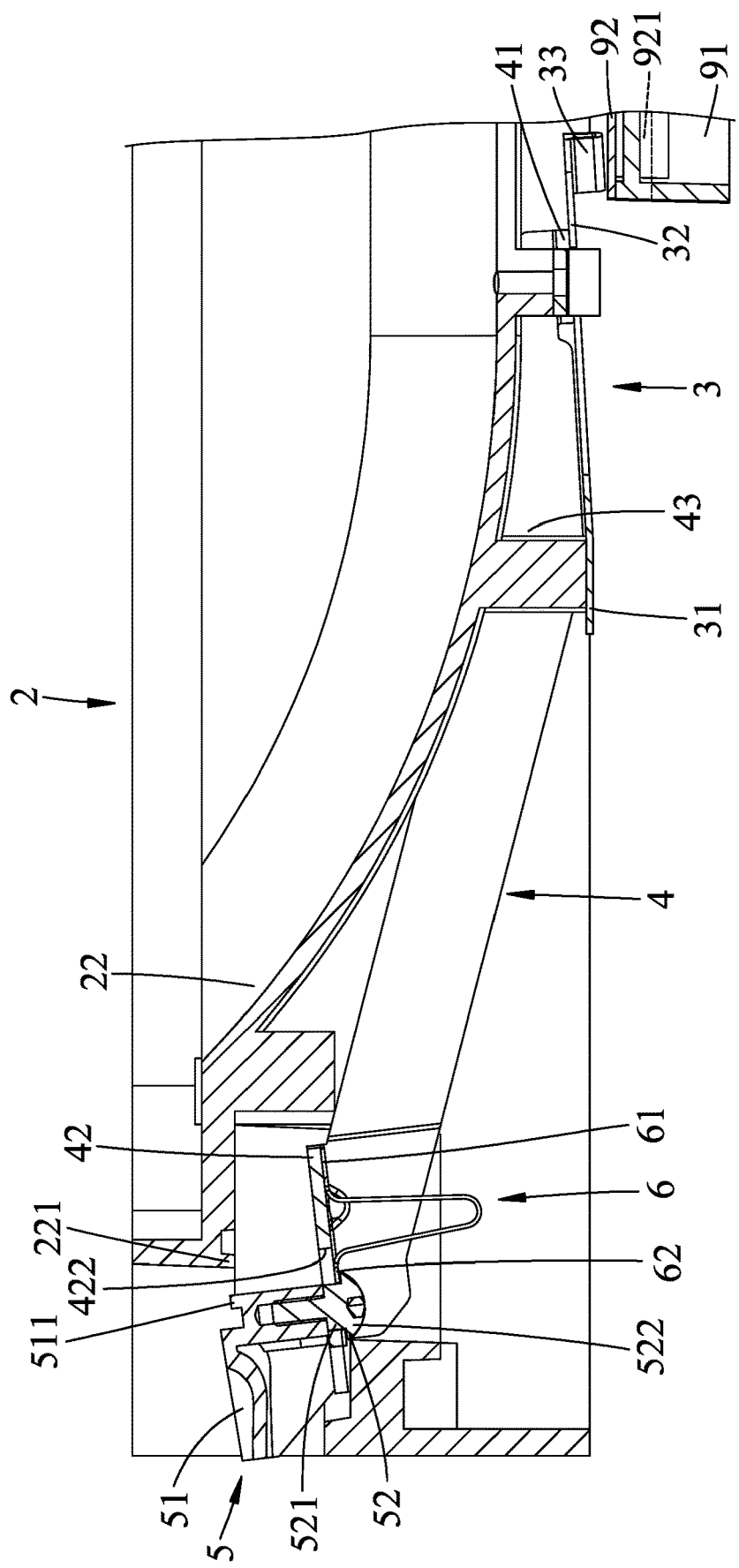
FIG. 10 is a view similar to FIG. 9, but illustrating the slide block in a process of moving from the non-engaging position to an engaging position.
Figure 11:
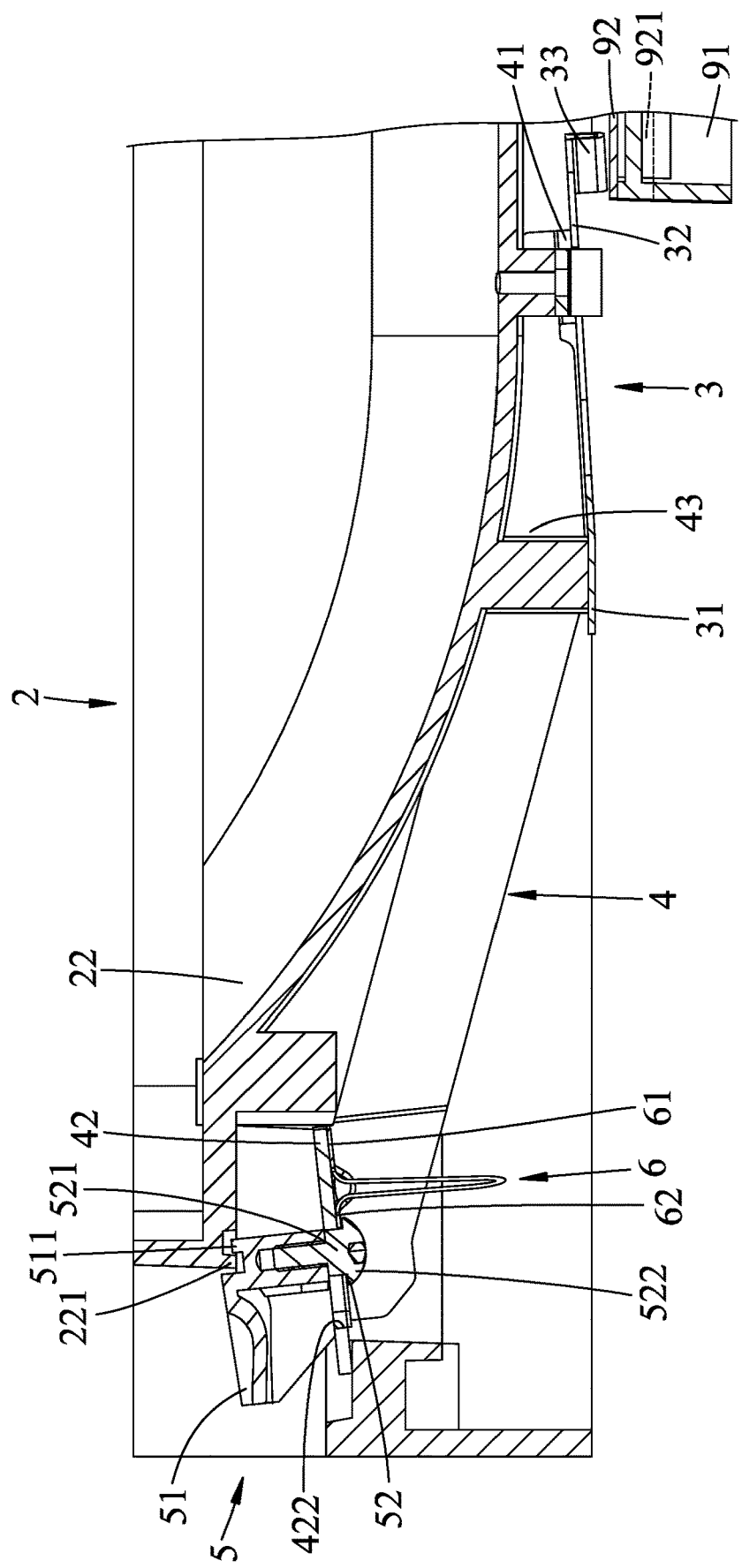
FIG. 11 is a view similar to FIG. 10, but illustrating the slide block at the engaging position when the elastic member is in the releasing state.

The lever member 4 is disposed in the mounting portion 22 of the working table 2. The lever member 4 has a linking portion 41 connected to the movable portion 32 of the elastic member 3, a handle portion 42 opposite to the linking portion 41, and a supporting portion 43 connected between the linking portion 41 and the handle portion 12 and disposed over the fixing portion 31 of the elastic member 3. The handle portion 42 of the lever member 4 has a guide hole 421, and two slide holes 422 spaced apart from each other in a transverse direction (T) that is perpendicular to the extending direction (E). As shown in FIGS. 9 to 11, the mounting portion 22 of the working table 2 has an engaging section 221 that is proximate to the handle portion 42 of the lever member 4.

Referring to FIGS. 5, 6, 9, and 10, the slide block unit 5 includes a slide block 51 and two limiting members 52. The slide block 51 is disposed slidably on the handle portion 42 of the lever member 4 and has an engaging portion 511. In this embodiment, each of the engaging section 221 of the mounting portion 22 of the working table 2 and the engaging portion 511 of the slide block 51 is configured as a hook. Each of the limiting members 52 has an insert portion 521 connected to the slide block 51, extending through a respective one of the slide holes 422 of the handle portion 42, and movable in the extending direction (E) along the respective one of the slide holes 422, and a stop portion 522 connected to an end of the insert portion 521 that is opposite to the slide block 51, and having a width in the transverse direction (T) larger than that of the respective one of the slide holes 422.

The biasing member 6 has a coupling portion 61 connected to the handle portion 42 of the lever member 4, and a biasing portion 62 opposite to the coupling portion. 61 for biasing the slide block 51 away from the elastic member 3. Specifically, the insert portion 521 of each of the limiting members 52 extends through the biasing portion 62 of the biasing member 6 before extending through the respective one of the slide holes 422.

Referring to FIGS. 5, 7 and 8, the guide member 7 is connected to the mounting portion 22 of the working table 2, extends through the guide hole 421 of the handle portion 42 of the lever member 4, and has a head segment 71 disposed at a side of the handle portion 42 of the lever member 4 that is opposite to the mounting portion 22 of the working table 2.

The spring 8 surrounds the guide member 7, and is connected between the head segment 71 of the guide member and the handle portion 42 of the lever member 4 for biasing the handle portion 42 upwardly away from the head segment 71 of the guide member 7.

Referring to FIGS. 9 to 11, the handle portion 42 of the lever member 4 is movable to convert the elastic member 3 from a locking state (see. FIG. 9) for engaging the protruding portion 33 of the elastic member 3 with the one of the notches 921 so that the working table 2 is non-rotatable relative to the base seat 91, to a releasing state (see FIG. 10) for moving the movable portion. 32 of the elastic member 3 away from the scale disc 92 so that the protruding portion 33 is disengaged from the one of the notches 921 to permit rotation of the working table 2 to the base seat 91.

When the elastic member 3 is in the locking state, the slide block 51 is disposed at a non-engaging position that is distal from the elastic member 3. The slide block 51 is operable to move the handle portion 42 of the lever member 4 downwardly, such that the movable portion 32 of the elastic member 3 is moved upwardly to convert the elastic member 3 from the locking state to the releasing state. Specifically, when the elastic member 3 is in the locking state, the supporting portion 43 of the lever member 4 abuts against the fixing portion 31 of the elastic member 3, so that downward movement of the handle portion 42 of the lever member 4 results in an upward movement of the linking portion 41 of the lever member 4.

When the elastic member 3 is n the releasing state, the slide block 51 is slidable from the non-engaging position toward the elastic member 3 to an engaging position (see FIG. 11), where the engaging portion 511 engages the engaging section 221 of the mounting portion 22 of the working table 2, thereby securing the position of the handle portion 42 of the lever member 4 relative to the mounting portion 22 of the working table 2 and thereby maintaining the elastic member 3 at the releasing state.

In this embodiment, the lever member 4 is formed via bending a piece of sheet metal. In assembling, the linking portion 41 of the lever member 4 and the movable portion 32 of the elastic member 3 are fastened together by a rivet so that, in the manufacturing process of the elastic member 3 and the lever member 4, each of the linking portion 41 and the movable portion 32 is only required to be formed with a rivet hole (not shown) for insertion of the rivet. Afterwards, an operator only needs to secure the fixing portion 31 of the elastic member 3 onto the mounting portion 22 of the working table 2 for completing the assembling of the positioning device. In comparison with the aforesaid conventional positioning device 1, the positioning device according to the present disclosure has a simpler structural design, which facilitates the manufacturing and assembling thereof.

By virtue of the disposition of the guide member 7 extending through the guide hole 421 of the handle portion 42 of the lever member 4, the handle portion 42 can move downwardly along the guide member 7 against a resilient force of the spring 8 to actuate the conversion of the elastic member 3 from the locking state to the releasing state. The spring 8 serves to bias the handle portion 42 upwardly to thereby move the elastic member 3 toward the locking state.

In use, the operator can easily operate the positioning device by pressing the slide block 51 downwardly to convert the elastic member 3 to the releasing state, and then pushing the slide block 51 from the non-engaging position to the engaging position to maintain the elastic member 3 in the releasing state without having to continuously hold the slide block 51. Since the insert portion 521 of each of the limiting members 52 is retained in a respective one of the slide holes 422, the movement of the slide block 51 in the transverse direction (T) is limited.

When the scale disc 92 is rotated to a desired orientation and the operator disengages the engaging portion 511 from the engaging segment 221, the slide block 51 is automatically biased by the biasing member 6 to the non-engaging position.

Figure 12:
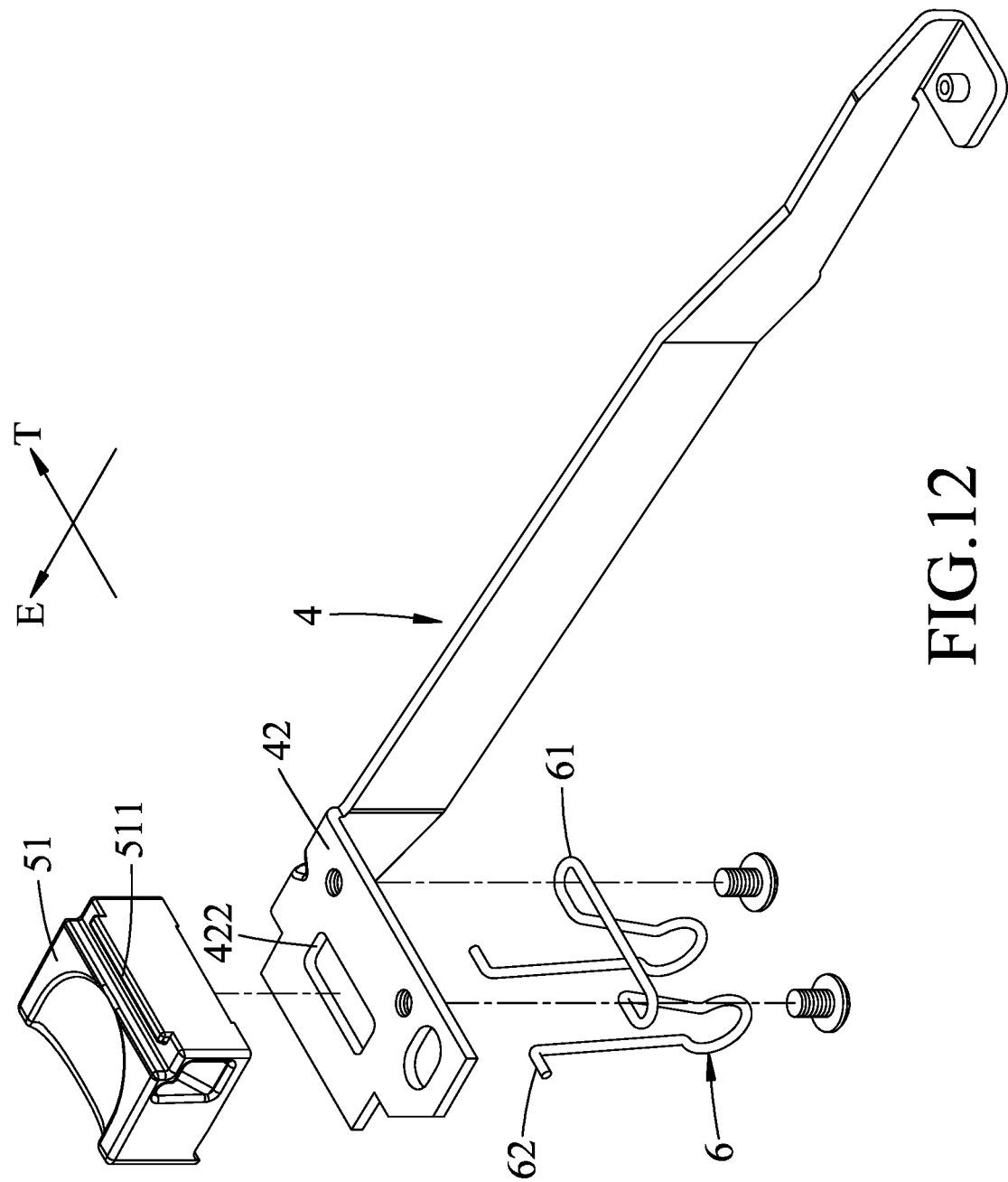
FIG. 12 is an exploded perspective view of a second embodiment of a positioning device according to the present disclosure.
Figure 13:
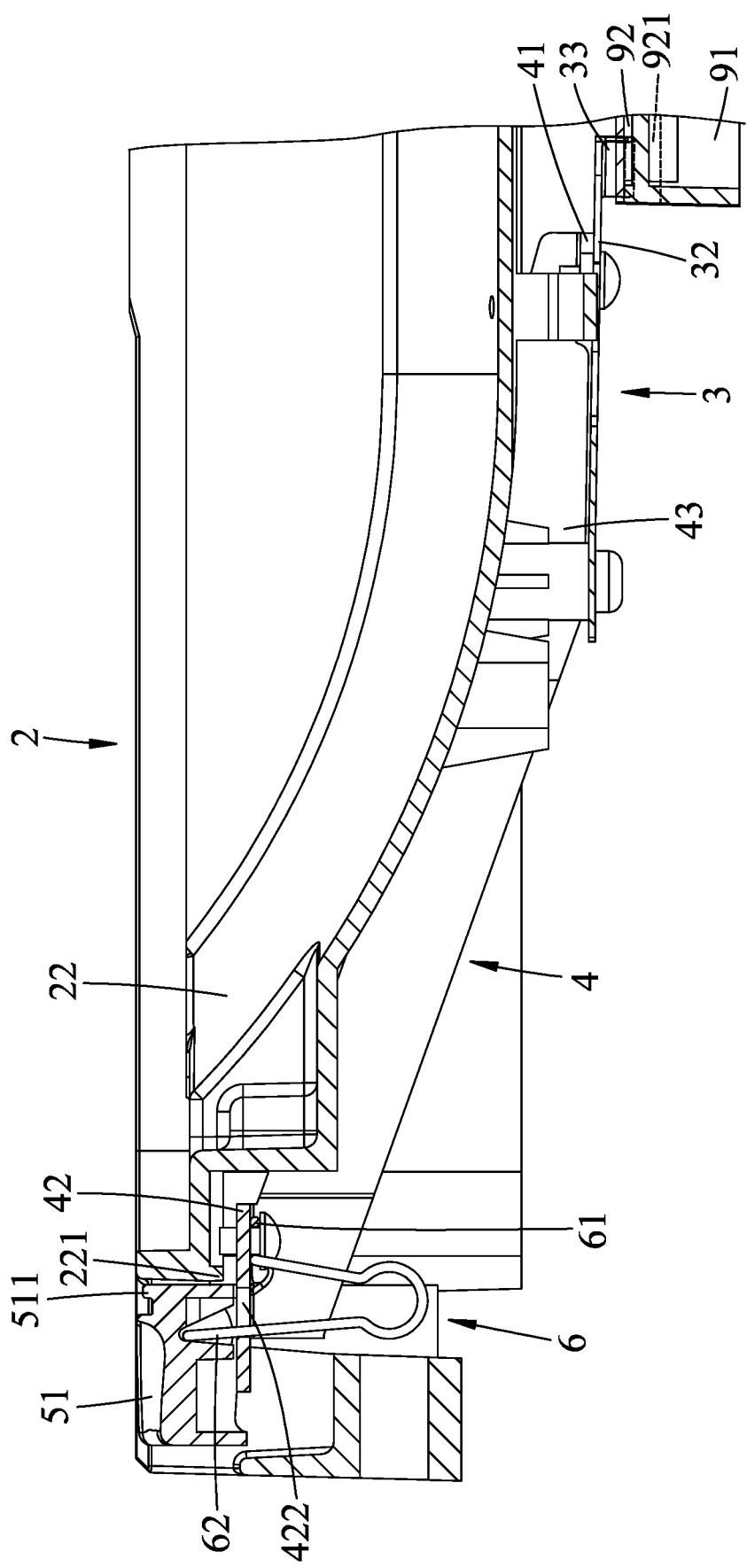
FIG. 13 is a view similar to FIG. 9, but illustrating the elastic member of the second embodiment in the locking state.

Referring to FIGS. 12 and 13, a second embodiment of the positioning device according to the disclosure has a structure similar to that of the first embodiment. The main difference between this embodiment and the previous embodiment resides in the configurations of the handle portion 42 of the lever member 4 and the biasing portion 62 of the biasing member 6.

In this embodiment, the handle portion 42 has only one slide hole 422. The limiting members 52 of the slide block unit 5 which are mentioned in the first embodiment are omitted. The biasing portion 62 of the biasing member 6 extends through the slide hole 422 and is connected to the slide block 51. As such, the second embodiment has the same advantage as those of the first embodiment.

Figure 14:
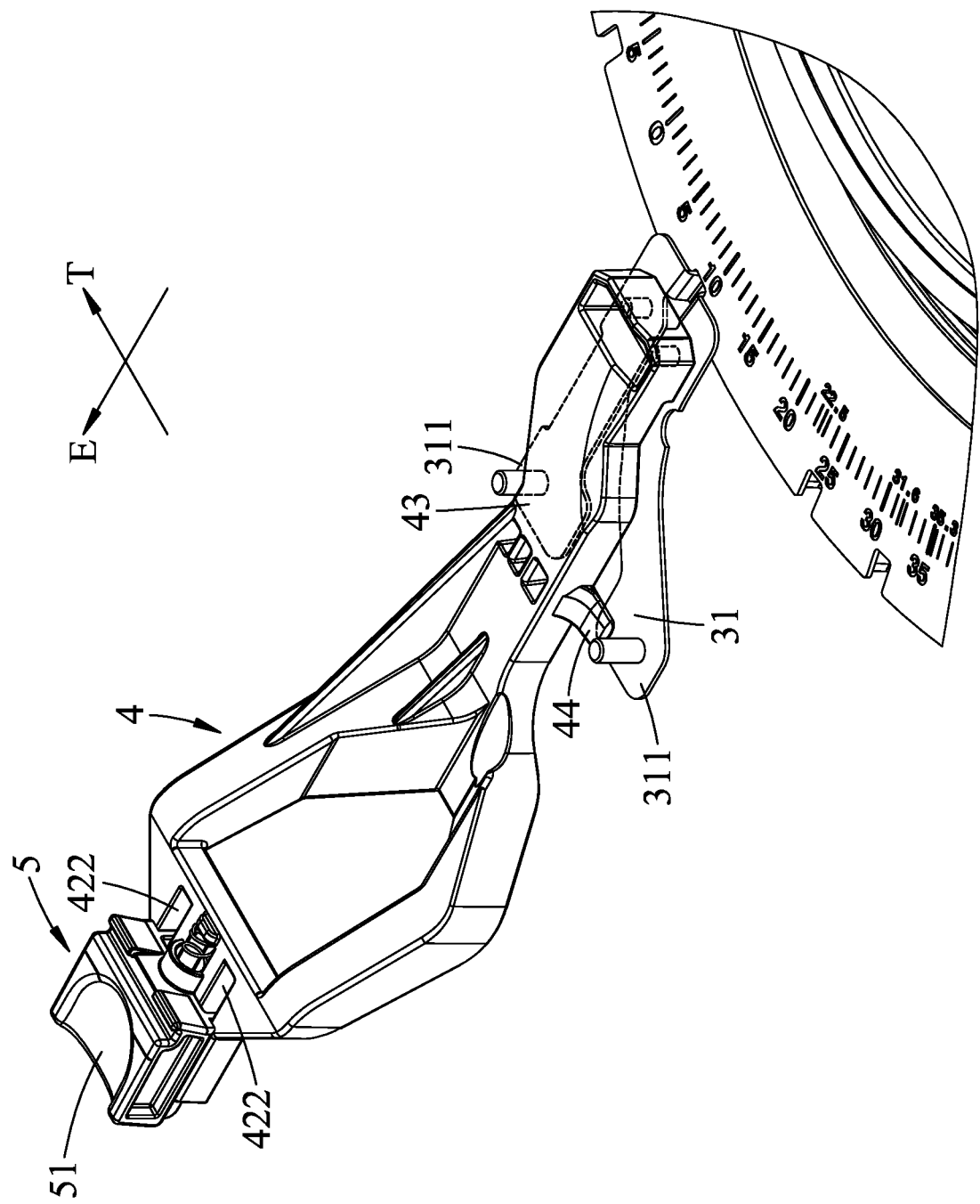
FIG. 14 is a fragmentary perspective view of the miter saw and the third embodiment of a positioning device according to the present disclosure.
Figure 15:
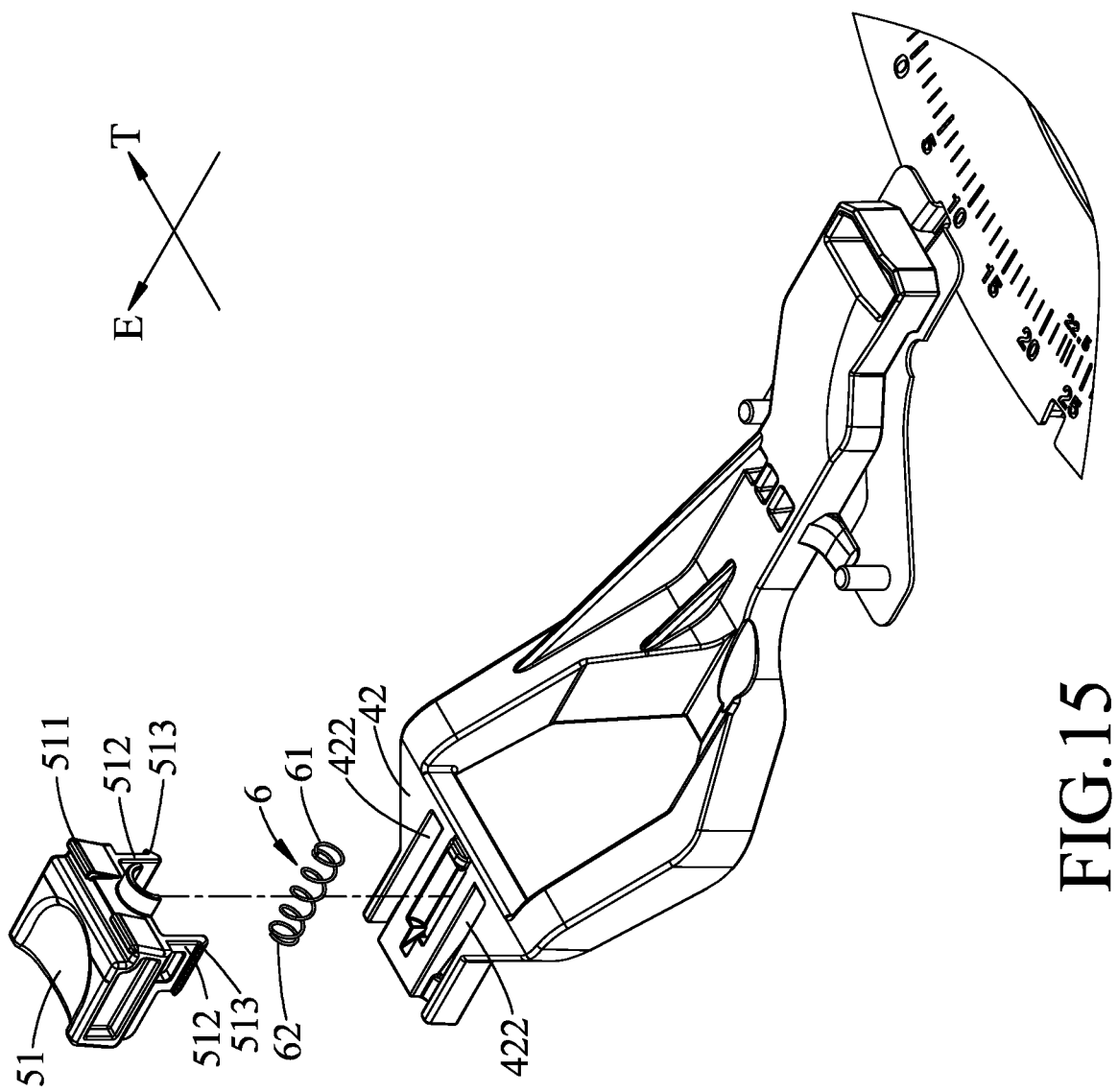
FIG. 15 is a fragmentary partly exploded perspective view of the third embodiment and the miter saw.
Figure 16:
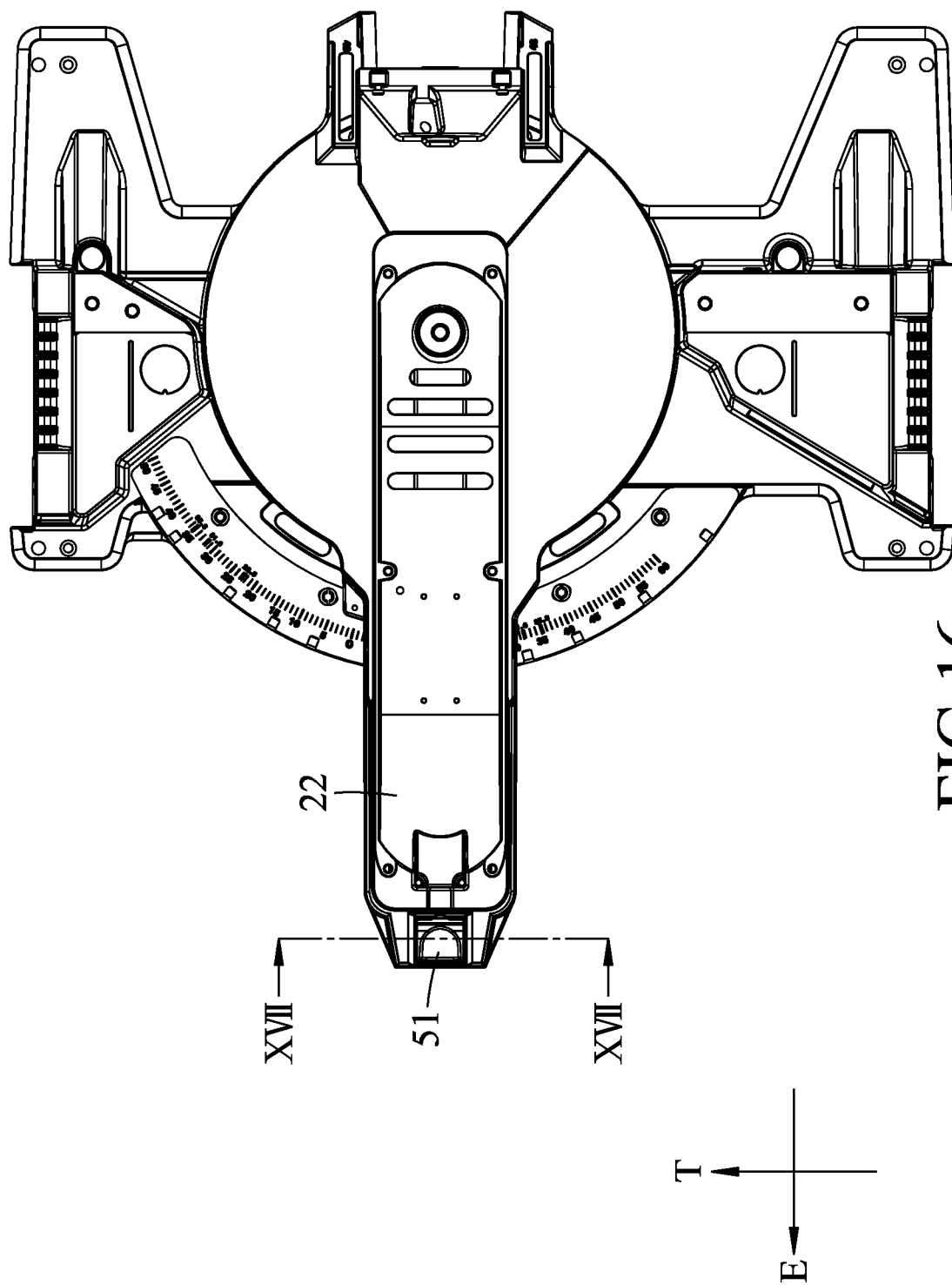
FIG. 16 is a top view of the third embodiment and the miter saw.

As shown in FIGS. 14 to 16, a third embodiment of the positioning device according to the disclosure has a structure similar to that of the first embodiment. The main difference between this embodiment and the previous embodiment resides in the following.

In this embodiment, the limiting members 52, the guide member 7, and the spring 8 illustrated in the first embodiment are omitted. The fixing portion 31 of the elastic member 3 has two fixing regions 311 that are spaced apart from each other in the transverse direction (T). The lever member 4 further has an abutment portion 44 that extends from the supporting portion 43 and that is disposed above the fixing portion 31 of the elastic member 3. The supporting portion 43 and the abutment portion 44 of the lever member 4 abut against the fixing regions 311 of the fixing portion 31 of the elastic member 3.

Figure 17:
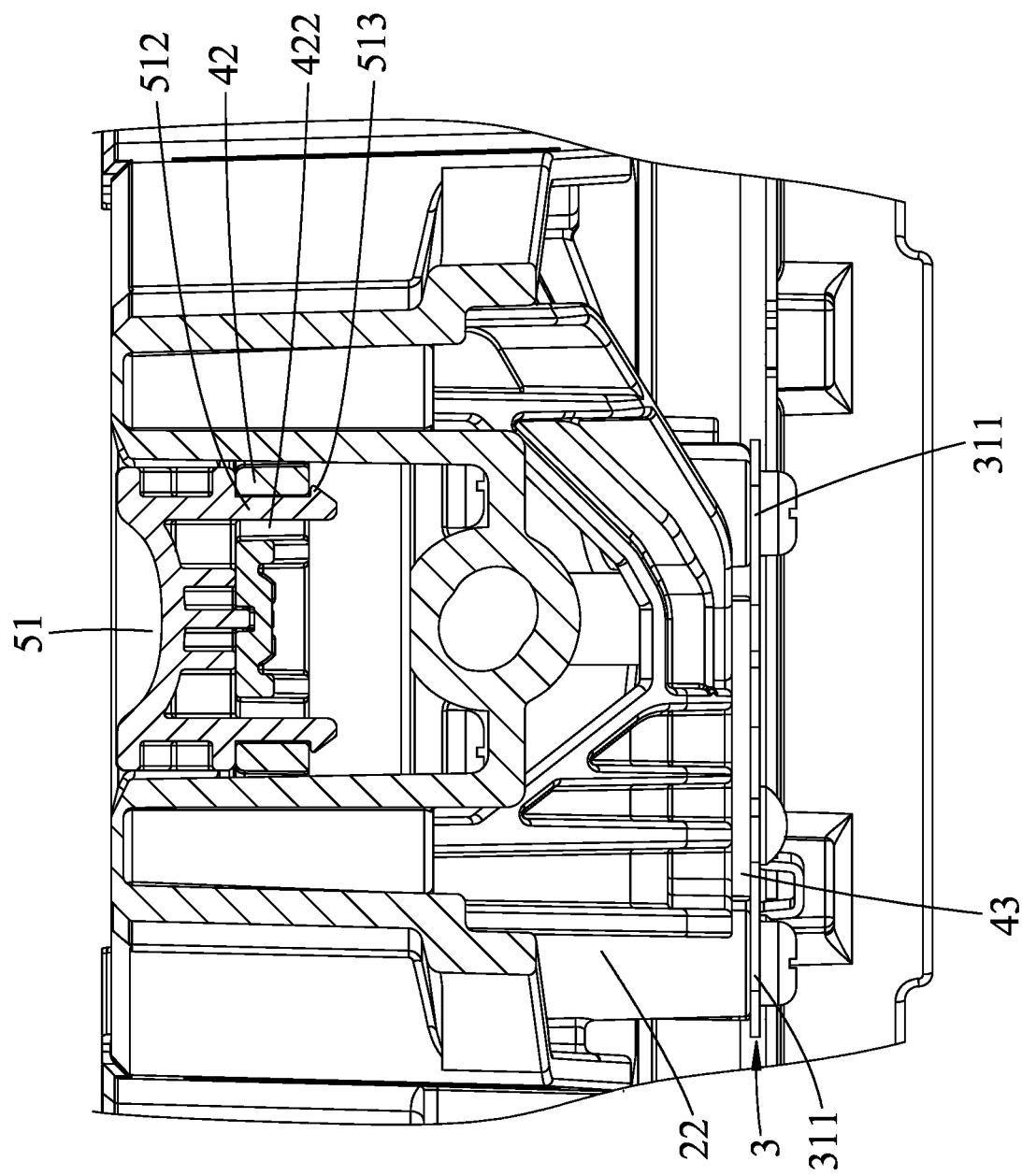
FIG. 17 is a fragmentary sectional view taken along line XVII-XVII in FIG. 16.

Referring to FIGS. 15 to 17, the slide block 51 further has two extending portions 512 that extend downwardly and respectively through the slide holes 422 of the handle portion 42 of the lever member 4, and that are respectively slidable along the slide holes 422 toward the elastic member 3. The slide block 51 further has two hook portions 513 that protrude respectively from bottom ends of the extending portions 512, and that abut respectively against a bottom side of the handle portion 42. In this embodiment, the biasing member 6 is configured as a spring. The coupling portion 61 of the biasing member 6 is connected to the handle portion 42 of the lever member 4, and the biasing portion 62 of the biasing member 6 is opposite to the coupling portion 61 in the extending direction (E) and is connected to the slide block 51 for biasing the slide block 51 toward the non-engaging position. The configuration of the biasing member 6 may vary in other embodiments.

With the supporting portion 43 and the abutment portion 44 abutting against the fixing regions 311 of the fixing portion 31 of the elastic member 3, the lever member 4 is supported firmly during operation of the positioning device of the disclosure. In addition, compared to the first embodiment, the connecting mechanism between the handle portion 42 of the lever member 4 and the slide block 51 of the slide block unit 5 is simpler.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A positioning device adapted for use in a miter saw, the miter saw including a base seat and a scale disc that is disposed on the base seat, and that is formed with a plurality of notches, said positioning device comprising:

a working table including a main portion that is adapted to be disposed above and connected rotatably to the base seat, and a mounting portion that extends in an extending direction from a side periphery of said main portion;

an elastic member having
 a fixing portion that is connected fixedly to said mounting portion of said working table,
 a movable portion that is opposite to said fixing portion and that is adapted to be adjacent to the scale disc, and a protruding portion that is connected to said movable portion, and that is adapted to downwardly move to removably engage one of the notches of the scale disc; and a lever member disposed in said mounting portion of said working table, and having
   a linking portion that is connected to said movable portion of said elastic member, and
   a handle portion that is opposite to said linking portion, said handle portion of said lever member being movable to convert said elastic member from a locking state for engaging said protruding portion of said elastic member with the one of the notches so that said working table is non-rotatable relative to the base seat, to a releasing state for moving said movable portion of said elastic member away from the scale disc so that said protruding portion is disengaged from the one of the notches to permit rotation of said working table relative to the base seat;

wherein said positioning device further comprises a slide block unit including a slide block, said slide block being disposed slidably on said handle portion of said lever member, and being engageable with said mounting portion of said working table;

wherein when said elastic member is in the locking state, said slide block is disposed at a non-engaging position that is distal from said elastic member;

wherein said slide block is operable to move said handle portion of said lever member downwardly, such that said movable portion of said elastic member is moved upwardly to convert said elastic member from the locking state to the releasing state; and wherein when said elastic member is in the releasing state, said slide block is slidable toward said elastic member to an engaging position to engage said mounting portion of said working table, thereby securing the position of said handle portion of said lever member relative to said mounting portion of said working table and thereby maintaining said elastic member at the releasing state.

2. The positioning device as claimed in claim 1, wherein:
said lever member further has a supporting portion connected between said linking portion and said handle portion and disposed over said fixing portion of said elastic member; and
when said elastic member is in the locking state, said supporting portion abuts against said fixing portion of said elastic member, so that the downward movement of said handle portion of said lever member results in an upward movement of said linking portion of said lever member.

3. The positioning device as claimed in claim 1, wherein:
said handle portion of said lever member has a guide hole; and
said positioning device further comprises an upright guide member connected to said mounting portion of said working table and extending through said guide hole, so that said handle portion of said lever member moves downwardly along said guide member to actuate the conversion of said elastic member from the locking state to the releasing state.

4. The positioning device as claimed in claim 3, wherein:
said guide member has a head segment disposed at a side of said handle portion of said lever member that is opposite to said mounting portion of said working table; and said positioning device further comprises a spring surrounding said guide member, and connected between said head segment of said guide member and said handle portion of said lever member for biasing said handle portion upwardly away from said head segment of said guide member.

5. The positioning device as claimed in claim 1, wherein:
said mounting portion of said working table has an engaging section proximate to said handle portion of said lever member; and
said slide block has an engaging portion engaging said engaging section of said mounting portion of said working table when said slide block is at the engaging position.

6. The positioning device as claimed in claim 1, further comprising a biasing member having:
a coupling portion that is connected to said handle portion of said lever member; and
a biasing portion that is opposite to said coupling portion for biasing said slide block toward the non-engaging position.

7. The positioning device as claimed in claim 6, wherein:
said handle portion of said lever member further has a slide hole; and
said biasing portion of said biasing member extends through said slide hole and is connected to said slide block.

8. The positioning device as claimed in claim 6, wherein:
said handle portion of said lever member further has two slide holes spaced apart from each other in a transverse direction that is perpendicular to the extending direction; and
said slide block unit further includes two limiting members, each of which has
   an insert portion connected to said slide block, extending through said biasing portion of said biasing member and a respective one of said slide holes, and movable in the extending direction along the respective one of said slide holes, and
   a stop portion connected to an end of said insert portion that is opposite to said slide block, and having a width in the transverse direction larger than that of the respective one of said slide holes.

9. The positioning device as claimed in claim 6, wherein:
said handle portion of said lever member further has two slide holes that are spaced apart from each other in a transverse direction that is perpendicular to the extending direction;
said mounting portion of said working table has an engaging section proximate to said handle portion of said lever member; and
said slide block has
   an engaging portion engaging said engaging section of said mounting portion of said working table when said slide block is at the engaging position,
   two extending portions extending downwardly and respectively through said slide holes of said handle portion of said lever member, and being slidable toward said elastic member, and
   two hook portions protruding respectively from bottom ends of said extending portions, and abutting respectively against a bottom side of said handle portion.

10. The positioning device as claimed in claim 9, wherein:
said fixing portion of said elastic member has two fixing regions spaced apart from each other in a transverse direction that is perpendicular to the extending direction;

said lever member further has
- a supporting portion connected between said linking portion and said handle portion and disposed over said fixing portion of said elastic member, and
- an abutment portion extends from said supporting portion; and said supporting portion and said abutment portion of said lever member abut against said fixing regions of said fixing portion of said elastic member such that, when said elastic member is in the locking state, the downward movement of said handle portion of said lever member results in an upward movement of said linking portion of said lever member.

* * * * *